United States Patent [19]

Dupre et al.

[11] 4,062,664
[45] Dec. 13, 1977

[54] PARTICLE SEPARATOR APPARATUS

[75] Inventors: George T. Dupre, Palatine; Thomas M. DeMarco, Chicago; Lawrence E. Borkowski, Elk Grove Village; Harvey Waliczek, Palatine, all of Ill.

[73] Assignee: NFE International, Ltd., Arlington Heights, Ill.

[21] Appl. No.: 667,120

[22] Filed: Mar. 15, 1976

[51] Int. Cl.² .................................................. B01D 50/00
[52] U.S. Cl. .................................. 55/319; 15/340; 55/324; 55/334; 55/337; 55/343; 55/356; 55/429; 55/437; 55/467
[58] Field of Search .................... 15/340; 55/321, 319, 55/324, 334, 343, 335, 337, 341, 356, 357, 434, 429, 467, 437; 254/2 R, 2 B; 280/43.12

[56] References Cited

U.S. PATENT DOCUMENTS

| | | | |
|---|---|---|---|
| 2,535,963 | 12/1950 | Sisemore | 55/467 |
| 3,622,123 | 11/1971 | Gloan | 254/2 R |
| 3,653,190 | 4/1972 | Lee et al. | 55/429 |
| 3,758,075 | 9/1973 | Briggs | 254/2 R |
| 3,780,502 | 12/1973 | Dupre et al. | 55/337 |
| 3,918,118 | 11/1975 | Berg et al. | 55/340 |

FOREIGN PATENT DOCUMENTS 351,753  7/1931  United Kingdom ................... 55/324

*Primary Examiner*—Bernard Nozick
*Attorney, Agent, or Firm*—Merriam, Marshall & Bicknell

[57] ABSTRACT

An improved multistage particle separator apparatus including a cyclone separator, a linear separator, a pair of vertical channels carrying exit airstreams from said linear separator, and a pair of air filter chambers on each side of said linear separator. A portable multistage separator including integral means for collecting the separated particulate material and for supporting the separator during movement.

4 Claims, 6 Drawing Figures

PARTICLE SEPARATOR APPARATUS

This invention relates to particle separating, collecting and conveying apparatus and in particular to compact and portable apparatus for performing such operations on wet or dry particulate material such as sand, metal and wood chips, gravel, slag, cement, plastic pellets, mill scale, etc.

BACKGROUND OF THE INVENTION

U.S. Pat. No. 3,780,502 issued to G. T. Dupre and T. M. DeMarco and assigned to the same assignee herein, collector and conveying apparatus for use in foundries and other manufacturing or service facilities. The aforementioned patent describes a centrifugal or cyclone separator for removing the heaviest material; a linear separator stage for accelerating the lighter particulate material downwardly through an orifice into an elongated chamber for separation and collection of the lighter particulate material and enabling the airstream to exit the chamber through the orifice; and an air filter stage including a filter element receiving the exiting airstream from the chamber for removing the lightest of the particulate material. Reference may be made to the aforementioned patent for a more complete description of the apparatus and the operation thereof.

While the prior separator apparatus is remarkably compact, lightweight and portable for the variety of particle collecting, separating, and conveying uses to which it has been applied, it has been desired to provide an even more compact and portable collector apparatus which can still efficiently perform in a manner equivalent to that of the prior unit.

SUMMARY OF THE INVENTION

The particle separator apparatus of the present invention in certain aspects provides an improvement of the apparatus of the aforementioned patent. In particular, the apparatus of the present invention includes a centrifugal or cyclone separator stage, a linear separator stage including an elongated chamber, and an air filter stage. However, in accordance with one aspect of the invention a pair of vertical channels are provided on opposite sides of the elongated linear separator chamber so that the exiting airstream at the top orifice of the chamber can split into two components and be directed downwardly from the top end of each channel towards the bottom of the channel. A pair of air filter chambers are provided on opposite sides of the linear separator chamber. The bottom end of each channel communicates the airstream exiting from the linear separator chamber downwardly through the channel and into the bottom portion of each of the air filter chambers so as to pass upwardly through the filter mediums enabling relatively clean air to be obtained.

Splitting of the exiting airstream by providing two vertical exit channels on each side of the linear separator chamber permits a more efficient transfer of the airstreams into and out of the chamber in that the outgoing airstreams exit through respective channels without crossing through or around the incoming airstream as required in the aforementioned apparatus.

In addition, a waste material dump hopper is provided mounted on a forklift truck so that raising of the hopper into a resiliently sealed position below the separator stages places the separator apparatus in position for operation. In this same upraised, sealing position of the hopper, the separator apparatus may be moved by means of the attached forklift, eliminating the need for any additional channel frames on the separator apparatus normally required for moving by means of a forklift. Lowering the separator apparatus frame to ground level unseats the hopper from below the separator stages and enables the hopper to be emptied of the collected particulate material in a well known manner.

DETAILED DESCRIPTION

Figure 1:
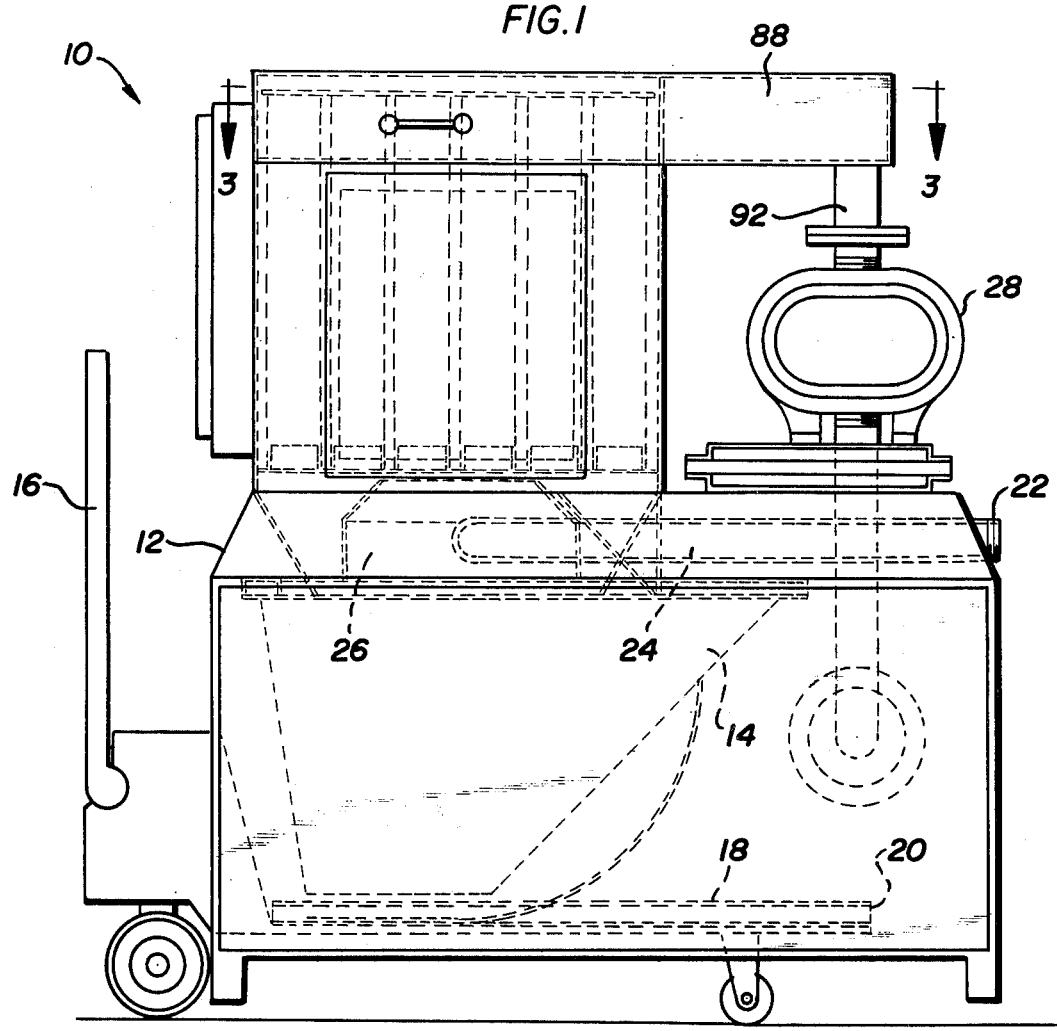
FIG. 1 is a side elevational view of an embodiment of the invention showing the improved separator apparatus with the removeable dump hopper and forklift truck.

Referring now to FIG 1, there is illustrated the improved separator and collector apparatus 10 of the present invention. It is to be understood that the apparatus is useful for separating particulate material from an airstream and for collecting such material such as when used as an industrial heavy duty vacuum collector.

Figure 2:
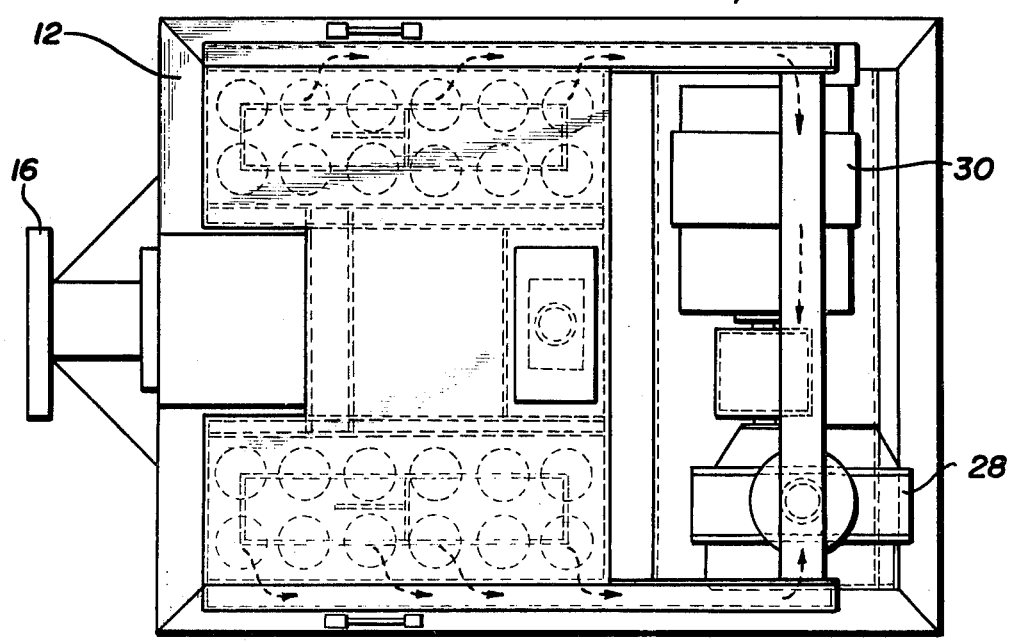
FIG. 2 is a plan view of the embodiment shown in FIG. 1 and illustrating the split air filter chamber on each side of a centrifugal separator and linear separator chambers.
Figure 3:
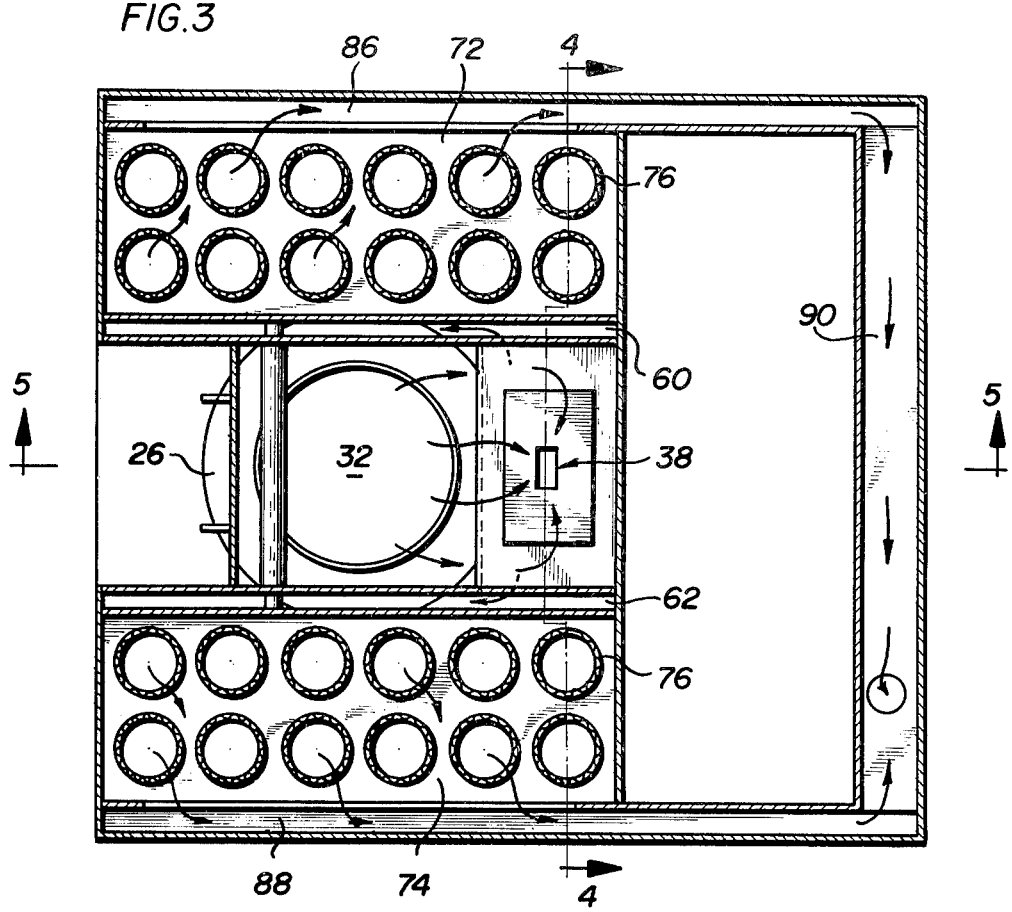
FIG. 3 is a sectional view taken along section lines 3—3 of FIG. 1 illustrating the air exiting the top of the centrifugal separator stage and entering the second stage linear separator.

The improved vacuum collector 10 shown in elevational view of FIG. 1 and in the plan view of FIG. 2 includes a frame 12, three stages of particulate material separation, a waste material dump hopper 14 mounted below the separator stages, and a forklift truck 16 rigidly mounted to the dump hopper 14. As shown in FIG. 1, the forklift truck 16 has raised the hopper 14 into sealing engagement on the frame 12 below the separator stages so as to lift the legs of frame 12 off of ground level as shown in FIG. 1. In this manner the separator apparatus may be readily moved about for use where desired. Lowering of frame 12 so that the legs again engage the ground level will disengage the hopper 14 from sealing engagement below the separator stages to allow for removal of the hopper and dumping of the waste material contained therein.

In particular, the hopper 14 includes a pair of tracks 18 which are rigidly mounted to the forks 20 of the lift truck 16. Thus, when the frame 12 is lowered to the ground and the hopper 14 is removed from underneath the frame 12, the hopper 14 will rotate so as to enable the waste material to be dumped therefrom in a manner well known in the art. The empty hopper can then be reinserted within the frame 12 underneath the separator stages and raised into sealing position below the separator. As indicated, when hopper 14 is in the sealing position, it also supports the frame 12 and the separator apparatus 10 on the fork truck 16 so that the separator apparatus 10 can be moved when desired. Therefore, the hopper 14 provides not only a particle collecting function in the apparatus as shown, but also supports the separator apparatus so that it can be a completely portable device.

An inlet 22 is provided for engagement with a standard flexible hose (not shown) for conveying the particulate material to be collected through a conduit 24 into a centrifugal separator 26. A blower 28 driven by an electric motor 30 provides the vacuum source for the separator 10.

Referring now to FIGS. 3-6, the details of a constructed embodiment of the invention can be more readily seen. In particular, the centrifugal separator 26 receiving the particulate matter through conduit 24 conveys the particulate material and incoming airstream in a curving path so that the heaviest of the particulate materials are separated from the airstream flow and tend to fall downwardly into hopper 14. The airstream is conveyed upwardly through a stack 32 so as to pass through a three-walled volume 34 communicating with a rectangular nozzle 36.

Figure 4:
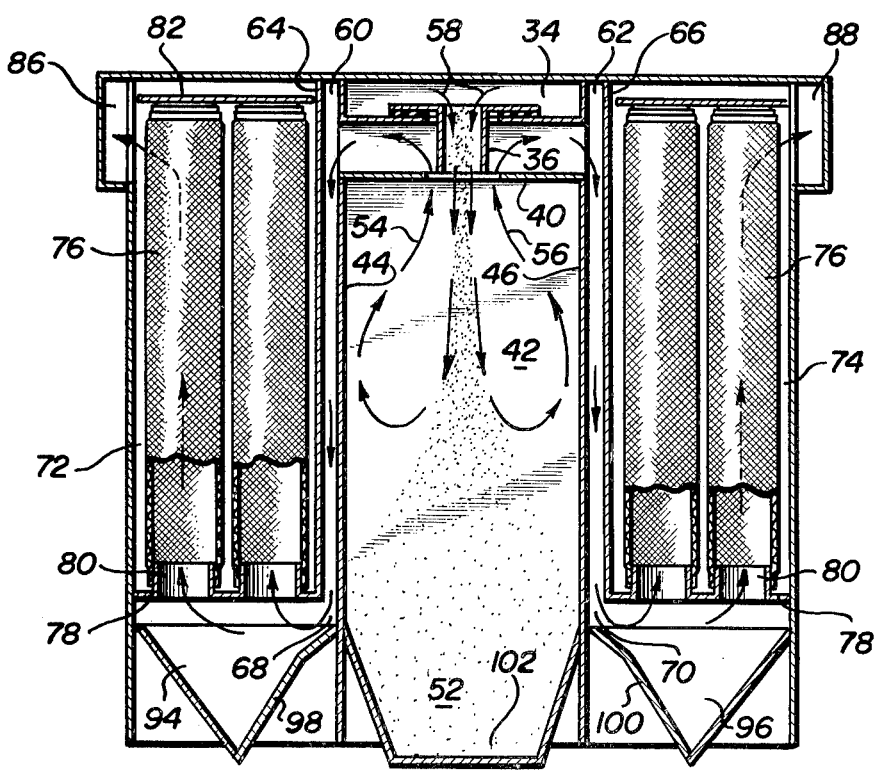
FIG. 4 is a sectional view taken along section lines 4Ð4 of FIG. 3 and illustrating the second stage linear separator chamber, the pair of side channels and the air filter chambers on each side of the separator chamber.
Figure 5:
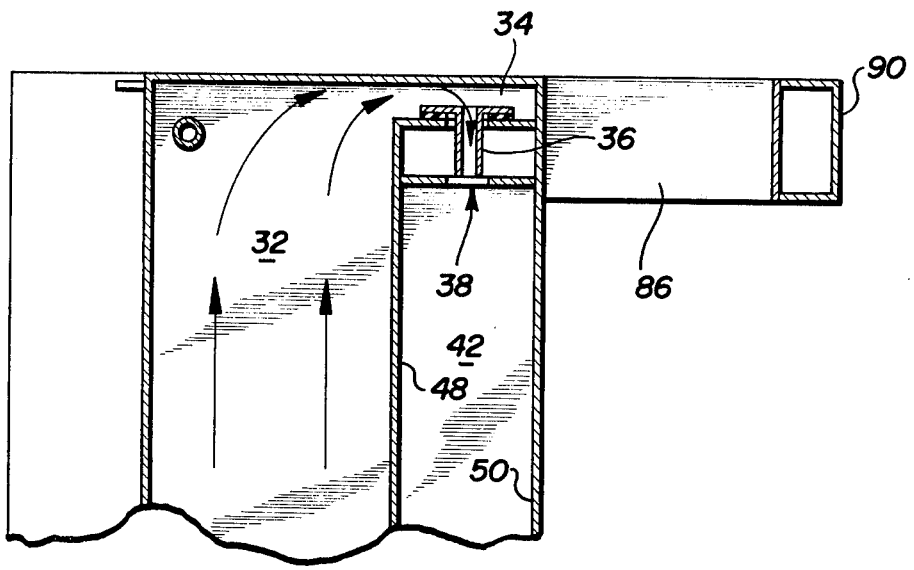
FIG. 5 is a fragmentary sectional view taken along section lines 5—5 of FIG. 3 illustrating the upper portions of the centrifugal separators and linear separator stages.
Figure 6:
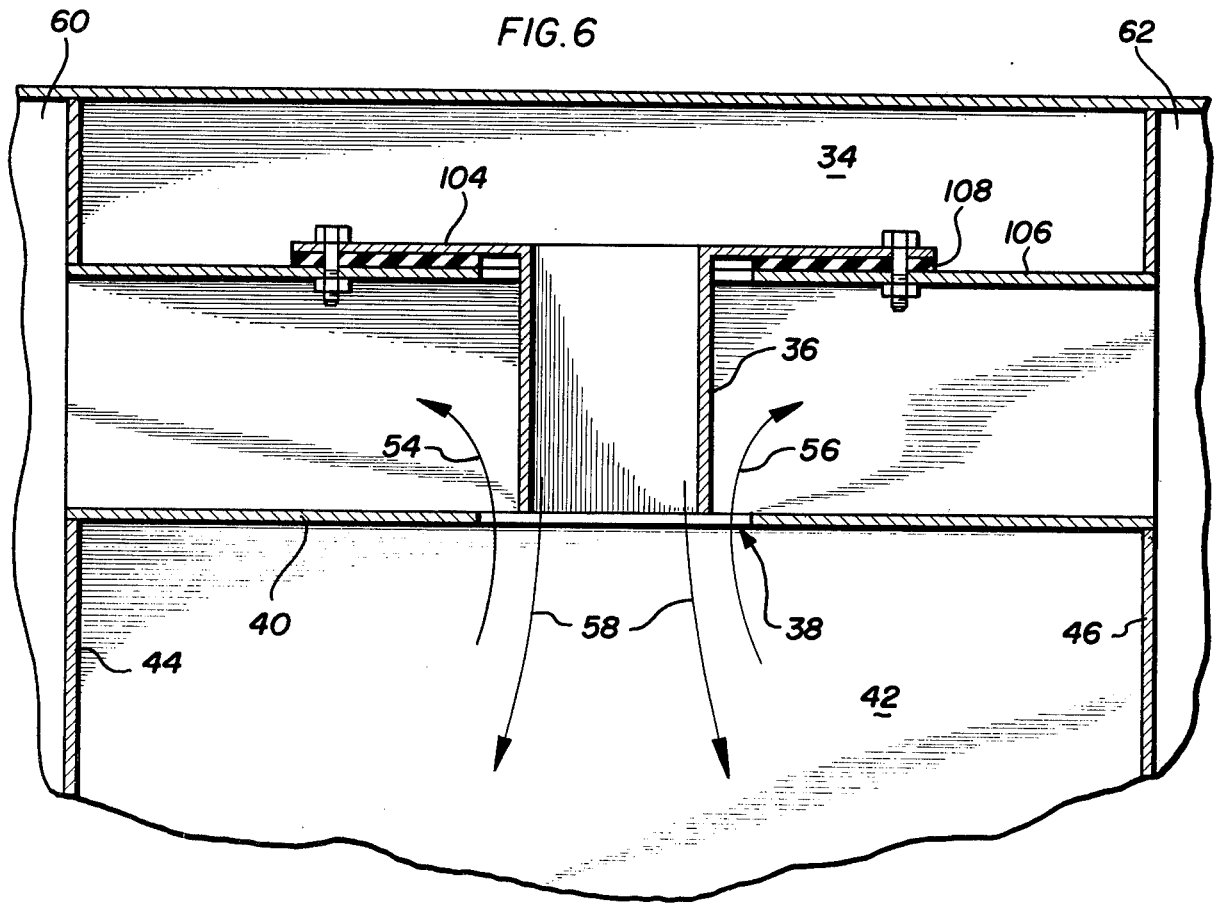
FIG. 6 is an enlarged fragmented sectional view of the upper portion of the linear separator stage.

The particulate material and airstream is accelerated by the nozzle 36 and directed downwardly through an orifice 38 in a top plate 40 of a linear separator chamber 42. The linear separator chamber 42 is completely enclosed by means of walls 44, 46, 48, 50, top wall 40, and the bottom wall 52. The air and particulate material entering through the orifice 38 are directed downwardly in the separation chamber 42, with the length of chamber 42 sized with respect to the velocity of the incoming airstream so that the airstream rapidly expands in the chamber and its velocity is dissipated to zero before reaching the bottom quarter of the chamber 42. This enables a substantial amount of the lighter particulate material, including any wet matter to be gradually separated from the airstream as it proceeds downwardly in the chamber 42, and after separation to fall by its own weight to the bottom of the chamber 42 undisturbed by the incoming airstream. The dissipated airstream then backs up in the chamber and exits out through the orifice 38 as shown in FIGS. 4 and 6.

The split exiting airstreams 54, 56 are respectively conveyed downwardly through channels 60, 62. Channel 60 is defined between the separation chamber wall 44 and a wall member 64. Similarly, chamber 62 is formed between the chamber side wall 46 and a wall member 66. The exiting split airstreams 54, 56 conveyed downwardly through each of the vertical channels 60, 62 are communicated to the respective chamber bottoms 68, 70 for communication to the respective air filter chambers 72, 74.

It is to be particularly noted that an improvement of the present invention over the aforementioned patent resides in enabling the exiting airstream from chamber 42 to be split into a portion 54 and a portion 56 on each side of the incoming airstream 58 as the incoming and exiting airstreams pass each other going in opposite directions through the orifice 38 and to be directed to their respective vertical channels 60, 62 without having to cross over or around the incoming airstream. This increases the collection efficiency of the present embodiment as compared to the apparatus of the aforementioned patent.

Each of the filter chambers 72, 74 includes a plurality of cylindrical filter mediums 76 each formed for instance of an air permeable fibrous material for trapping the lightest of the remaining particulate material in the airstream. The filter mediums 76 are supported in each of the filter chambers by means of a bottom plate 78 having a series of upstanding cylindrical flanges 80 so that the filter mediums 76 are coaxially mounted thereover and attached to the flanges by any suitable means, such as adjustable clamps. A top plate 82 may be formed similarly to plate 80 so as to support the top end of the filter elements 76.

As is most clearly shown in FIG. 4, the exiting airstreams 54 and 56 having exited chamber 42 on opposite sides of the orifice 38 and having passed respectively downwardly through the vertical channels 60, 62, enter the respective air filter chambers 72, 74 at the inlets 68, 70 and are then respectively directed upwardly through the center portions of each of the filter mediums 76 so as to pass from the inside to the outside of the filter elements in going from the bottom to the top of the respective air filter chambers.

A pair of channel ducts 86 and 88 at the top end of the respective air filter chambers 72, 74 are provided for communicating the relatively clean airstream exiting the air filter chambers to a crossover duct 90 for return through a connecting member 92 to the blower 30.

In operation, the heaviest of the particulate material in the airstream being conveyed through inlet 22 and into the cyclone or centrifugal separator 26 is allowed to fall back into the hopper 14, with the airstream and the lighter of the particulate material continuing upwardly through the stack 32, passing through the three-walled chamber 34 and being accelerated through nozzle 36 downwardly into the linear separator chamber 42. After the lighter particulate material is separated from the airstream in the linear separator chamber 42 as previously described, the particulate material accumulating at the bottom of the chamber 42 substantially undisturbed by the incoming airstream at the top of the chamber, the exiting airstreams 54, 56 are each allowed to pass through the orifice 38 and to pass into their respective vertical channels 60, 62 without having to cross over or around the incoming airstream 58. The exiting airstreams from channel 42 are thus less impeded in the present improved embodiment as compared to the apparatus of the aforementioned patent, resulting in an increased collection efficiency.

Each of the exiting airstreams then passes downwardly through its respective vertical channel and upwardly through the respective air filter chamber passing through the filter mediums from inside out and thereby leaving the lightest and very fine particulate material trapped in the filter mediums 76. Also, any additional particulate material carried by the exiting airstreams 54, 56 when traveling downwardly through the vertical channels are directed into the bottom portions 94, 96 of the filter chambers for collection. Means are provided (not shown) for periodically shaking the filter mediums to remove the trapped material.

Each of the air filter chambers 72, 74 contains a flap member 98, 100. The linear separator chamber 42 also contains a flap member 102 at the bottom thereof. Upon deactuation of the blower 30, the respective flap members open the bottom of the respective chambers so as to enable the collected particulate material therein to be dropped by its own weight into the hopper 14.

The hopper 14 includes a resilient sealing material on its top edge so that the hopper can be placed in sealing engagement with the separator apparatus when raised. The blower 30 may then be operated to provide a vacuum source for the apparatus.

The details of the nozzle constructions are shown in FIG. 6. The rectangular nozzle 36 includes an upper flange 104 which is bolted to a nozzle plate 106 with an intermediate resilient gasket member 108 therebetween. For purposes of illustration of the present invention, the nozzle 36 dimensions are 1¼ inch by 2¼ inch by about 3⅜ inches long. As can be seen in FIG. 6, the nozzle 36 is axially aligned above the orifice 38 and the bottom of the nozzle 36 extends almost in line with the orfice. The orifice 38 dimensions are approximately 2¾ inches by 3¾ inches so that the exiting airstreams 54, 56 can pass out the chamber 42 at the orifice 38 on opposite sides of the incoming airstream 58. The chamber 42 in a constructed embodiment of the invention measured 7¼ inches by 13 inches by 25 inches in length. The above dimensions of the respective components of the invention are those provided in a 15 horsepower unit. It is to be understood of course that for units with more or less horsepower the above dimensions, particularly the nozzle and orifice dimensions will change slightly so as to maintain the velocity of air entering chamber 42 to be a constant value. This can readily be accomplished by those skilled in the art since less air is moved by lower horsepower units as compared to greater horsepower units, and the particular component dimensions may be accordingly varied.

The foregoing detailed description has been given for clearness of understanding only, and no unnecessary limitations should be understood therefrom as modifications will be obvious to those skilled in the art.

What is claimed is:

1. In portable vacuum collector apparatus for separating particulate material from an airstream, including a movable frame, an elongated, enclosed, four-sided separation chamber mounted on said frame, said separation chamber having a rectangular cross section and including an orifice at the top end thereof for receiving the particulate material laden airstream, means for downwardly directing said airstream through said orifice into said separation chamber and enabling an exiting airstream to exit said chamber through said orifice leaving a substantial portion of the particulate material to accumulate for collection at the bottom of said chamber, and blower means mounted to said frame and interconnected to said elongated separation chamber for directing said airstream and particulate material thereto, the improvement comprising:

a pair of air filter chambers mounted to said movable frame adjacent respective opposite sides of said separation chamber, each of said respective opposite separator chamber sides also forming a common wall of a respective air filter chamber;

a centrifugal separator mounted to said movable frame intermediate said air filter chambers and immediately adjacent said separation chamber, said centrifugal separator having an input receiving said airstream and an output communicating said airstream to said orifice;

an inlet at the top of each air filter chamber for receiving a portion of said exiting airstream from said separation chamber and an outlet at the top of each filter chamber coupled to said blower means;

a plurality of cylindrical, air permeable fibrous filter elements for separating particulate material;

a top flange plate mounted in each air filter chamber substantially towards the top thereof;

a bottom flange plate mounted in each air filter chamber substantially towards the bottom thereof, said bottom flange plate each including a plurality of upstanding cylindrical flanges with openings;

means for mounting one end of said cylindrical, air permeable fibrous filter elements to each of said upstanding cylindrical flanges and for mounting the other end of said filter elements to said top flange plate so that said one end of each of said filter elements communicates the interior of said filter elements with said openings;

a wall member in each air filter chamber having one end mounted to said bottom flange plate and an opposite end mounted to the top of said respective air filter chambers and extending intermediate said common wall and said fibrous filter elements to restrict an airstream to pass from said bottom plate openings upwardly through said filter elements to said respective outlet;

said wall member and a respective common wall defining a respective vertical channel therebetween in each of said air filter chambers extending between said inlet at the air filter chamber top and said openings in the bottom flange plates to direct said respective portion of said exiting airstream received at said respective air filter chamber inlet to said respective bottom flange plate openings.

2. The improvement of claim 4, including a pair of ducts each having one end connected to the outlet at the top of each filter chamber and another end extending towards said blower means, and a cross duct interconnecting said pair of ducts to said blower means for directing a substantially particle-free airstream thereto.

3. In portable vacuum collector apparatus for separating particulate material from an airstream, including a movable frame, an elongated, enclosed, four-sided separation chamber mounted on said frame, said separation chamber having a rectangular cross section and including an orifice at the top end thereof for receiving the particulate material laden airstream, means for downwardly directing said airstream through said orifice into said separation chamber and enabling an exiting airstream to exit said chamber through said orifice leaving a substantial portion of the particulate material to accumulate for collection at the bottom of said chamber, and blower means mounted to said frame and interconnected to said elongated separation chamber for directing said airstream and particulate material thereto, the improvement comprising:

a pair of air filter chambers mounted to said movable frame adjacent respective opposite sides of said separation chamber, each of said respective opposite separator chamber sides also forming a common wall of a respective air filter chamber;

a centrifugal separator mounted to said movable frame intermediate said air filter chambers and immediately adjacent said separation chamber, said centrifugal separator having an input receiving said airstream and an output communicating said airstream to said orifice;

an inlet at the top of each air filter chamber for receiving a portion of said exiting airstream from said separation chamber and an outlet at the top of each filter chamber coupled to said blower means;

a plurality of air permeable fibrous filter elements having a peripheral wall for separating particulate material;

means for mounting said air permeable fibrous filter elements within each of said air filter chambers with respective top and bottom ends adjacent the top and bottom of said air filter chambers;

a wall member in each air filter chamber having one end mounted adjacent to the bottom of said filter elements and an opposite end mounted to the top of said respective air filter chambers and extending intermediate said common wall and said fibrous filter elements to restrict an airstream to pass upwardly through said filter elements to said respective outlet;

said wall member and a respective common wall defining a respective vertical channel therebetween in each of said air filter chambers extending between said inlet at the air filter chamber top and said filter element bottom ends to direct said respective portion of said exiting airstream received at said respective air filter chamber inlet to said respective filter element bottom ends.

4. In a portable vacuum collector apparatus for separating particulate material from an airstream, including a movable frame, an elongated, enclosed, four-sided, separation chamber mounted on said frame, said separation chamber having an rectangular cross section and including an orifice at the top end thereof for receiving the particulate material laden airstream through said orifice into said separation chamber and enabling an exiting airstream to exit said chamber through said orifice leaving a substantial portion of the particulate material to accumulate for collection at the bottom of said chamber, and blower means mounted to said frame and interconnected to said elongated separation chamber for directing said airstream and particulate material thereto, the improvement comprising:

a pair of air filter chambers mounted to said movable frame adjacent respective opposite sides of said separation chamber, each of said respective opposite separator chamber sides also forming a common wall of a respective air filter chamber;

a centrifugal separator mounted to said movable frame intermediate said air filter chambers and immediately adjacent said separation chamber, said centrifugal separator having an input receiving said airstream and an output;

an elongated stack extending between said air filter chambers and immediately adjacent said separation chamber communicating said airstream from said centrifugal separator output to said orifice;

an inlet at the top of each air filter chamber for receiving a portion of said exiting airstream from said separation chamber and an outlet coupled to said blower means;

a plurality of air permeable fibrous filter elements, having a peripheral wall for separating particulate material;

means for mounting said air permeable fibrous filter elements within each of said air filter chambers with respective top and bottom ends adjacent the top and bottom of said air filter chambers; and respective passageway means for coupling said airstream from said air filter chamber inlet to one end of said respective filter elements, said airstream traversing from said one end towards the other end, through said filter elements and said filter chamber outlet to said blower means.

* * * * *

UNITED STATES PATENT OFFICE
CERTIFICATE OF CORRECTION

Patent No. 4,062,664     Dated December 13, 1977

Inventor(s) George T. Dupre; Thomas M. DeMarco; Lawrence E. Borkowski; and Harvey Waliczek It is certified that error appears in the above-identified patent and that said Letters Patent are hereby corrected as shown below:

Column 1, line 13,     after "herein," insert --describes a heavy duty particulate material separator,--.

Column 7, line 26,     change "an rectangular" to --a rectangular--.

Signed and Sealed this

Fifteenth Day of August 1978

[SEAL]

Attest:

RUTH C. MASON
*Attesting Officer*

DONALD W. BANNER
*Commissioner of Patents and Trademarks*